United States Patent
He et al.

(10) Patent No.: US 11,981,976 B2
(45) Date of Patent: May 14, 2024

(54) METHOD FOR PURIFYING NICKEL-COBALT-MANGANESE LEACHING SOLUTION

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP VEHICLES RECYCLING CO., LTD., Changsha (CN)

(72) Inventors: Ran He, Foshan (CN); Honghui Tang, Foshan (CN); Minjie Ye, Foshan (CN); Dongren Lyu, Foshan (CN); Bo Liu, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP VEHICLES RECYCLING CO., LTD., Changsha (CN)

( * ) Notice: Subject to any disclaimer, the term of this patent is extended or adjusted under 35 U.S.C. 154(b) by 0 days.

(21) Appl. No.: 18/044,567

(22) PCT Filed: Aug. 3, 2021

(86) PCT No.: PCT/CN2021/110265
§ 371 (c)(1),
(2) Date: Mar. 8, 2023

(87) PCT Pub. No.: WO2022/052670
PCT Pub. Date: Mar. 17, 2022

(65) Prior Publication Data
US 2023/0243017 A1    Aug. 3, 2023

(30) Foreign Application Priority Data

Sep. 9, 2020    (CN) .......................... 202010938544.8

(51) Int. Cl.
 C22B 3/44        (2006.01)
 C22B 7/00        (2006.01)
 H01M 10/54       (2006.01)
(52) U.S. Cl.
 CPC .............. *C22B 3/44* (2013.01); *C22B 7/007* (2013.01); *H01M 10/54* (2013.01)
(58) Field of Classification Search
 CPC ................................ C22B 3/44; C22B 7/007
 (Continued)

(56) References Cited

FOREIGN PATENT DOCUMENTS

| CN | 103643256 A | 3/2014 |
| CN | 104445425 A | 3/2015 |

(Continued)

OTHER PUBLICATIONS

International Search Report and Written Opinion in PCT/CN2021/110265 dated Nov. 3, 2021.

(Continued)

*Primary Examiner* — Melissa S Swain
(74) *Attorney, Agent, or Firm* — Buchalter; Jason W. Croft

(57) ABSTRACT

Disclosed is a method for purifying a nickel-cobalt-manganese leaching solution. The method may include: heating a nickel-cobalt-manganese leaching solution, adding a manganese powder thereto, adjusting the pH, reacting same, and filtering same to obtain iron-aluminum slag and a liquid with iron and aluminum removed therefrom; heating the liquid with iron and aluminum removed therefrom, adding a manganese powder thereto, adjusting the pH, reacting same, and filtering same to obtain copper slag and a solution with (Continued)

copper removed therefrom; heating the solution with copper removed therefrom, adding an alkaline solution thereto, adjusting the pH, reacting same, and filtering same to obtain a nickel-cobalt-precipitated solution and nickel-cobalt-manganese hydroxide; and adding water into nickel-cobalt-manganese hydroxide for slurrying, heating same, adding an acidic solution for dissolution, adjusting the pH, reacting same, heating same, adding a manganese powder thereto, adjusting the pH, and filtering same to obtain iron-aluminum slag and a nickel-cobalt-manganese sulfate solution.

7 Claims, 1 Drawing Sheet

(58) Field of Classification Search
USPC ...................................................... 423/150.1
See application file for complete search history.

(56) References Cited

FOREIGN PATENT DOCUMENTS

| CN | 105779787 A | 7/2016 |
|---|---|---|
| CN | 105958148 A | 9/2016 |
| CN | 107058745 A | 8/2017 |
| CN | 108866328 A | 11/2018 |
| CN | 110342581 A | 10/2019 |
| CN | 111206153 A | 5/2020 |
| CN | 111261967 A | 6/2020 |
| CN | 111455174 A | 7/2020 |
| CN | 111471864 A | 7/2020 |
| CN | 112159897 A | 1/2021 |
| CN | 112159897 B | 7/2022 |
| JP | 2011094206 A | 5/2011 |
| WO | 2022052670 A1 | 3/2022 |

OTHER PUBLICATIONS

First Office Action in Chinese Application CN202010938544.8 dated Nov. 12, 2021.
Supplementary Search in Chinese Application CN202010938544.8 dated Apr. 12, 2022.
Notification to Grant Patent Right for Invention n Chinese Application CN202010938544.8 dated Apr. 20, 2022.
First Office Action in Hungary Application P2200165 dated Sep. 26, 2022.

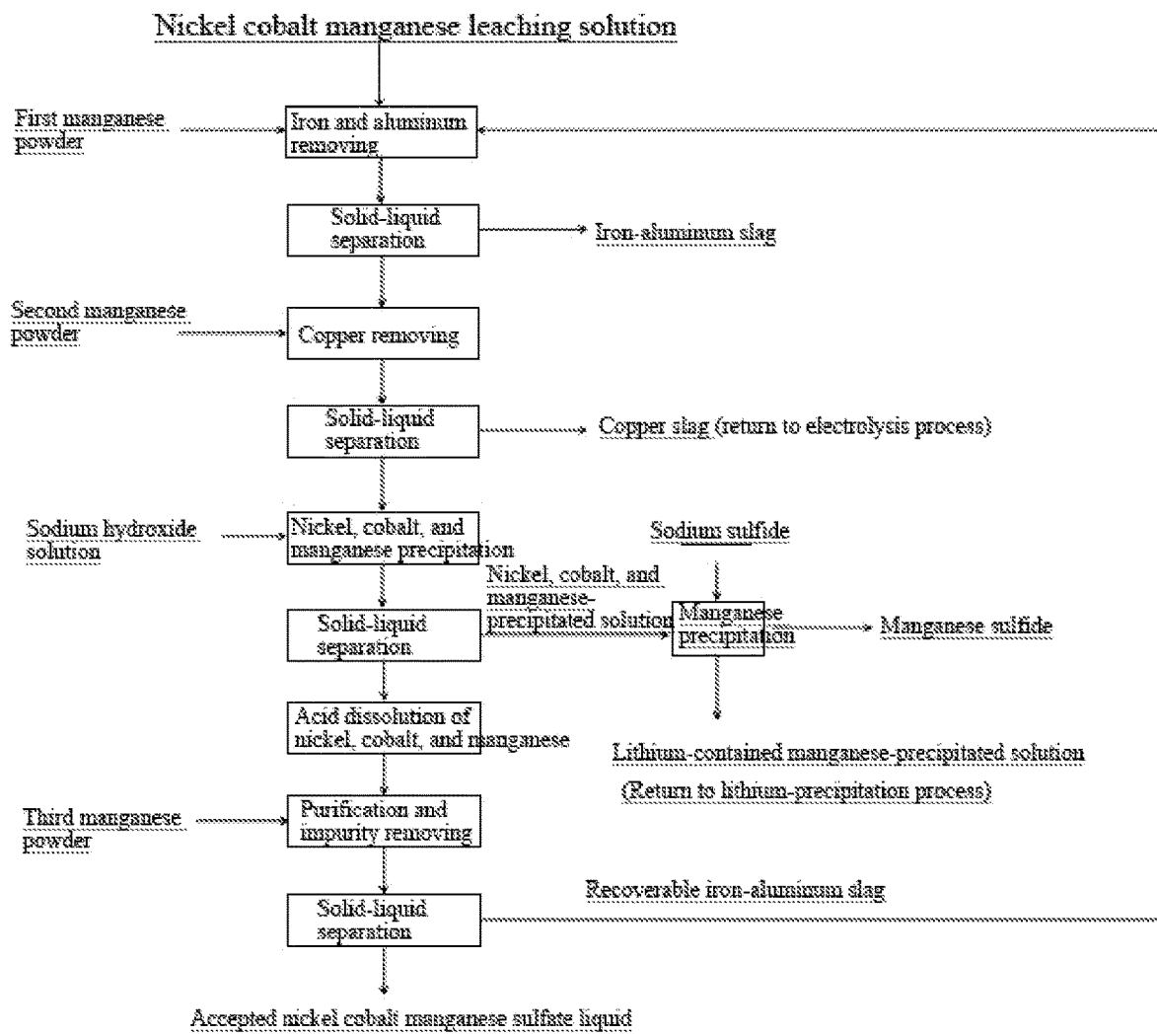

METHOD FOR PURIFYING NICKEL-COBALT-MANGANESE LEACHING SOLUTION

CROSS-REFERENCE TO RELATED APPLICATION

This application is a national stage filing under 35 U.S.C. § 371 of international application number PCT/CN2021/110265, filed Aug. 3, 2021, which claims priority to Chinese patent application No. 202010938544.8, filed Sep. 9, 2020. The contents of these applications are incorporated herein by reference in their entirety.

TECHNICAL FIELD

The present invention relates to the field of hydrometallurgy, and more particularly, to a method for purifying a nickel cobalt manganese leaching solution.

BACKGROUND

Nickel is an important national strategic element, and is widely applied to the fields of critical materials and high and new technologies, for example, batteries, stainless steel, and catalysis. Currently, nickel resources that can be developed and utilized by humans are mainly divided into two types: nickel sulfide ore and laterite-nickel ore. Since nickel sulfide ore has been exploited for a long period of time, recently, reserves decrease dramatically, and a resource crisis has occurred. However, the laterite-nickel ore resources are abundant, and can generate a plurality of intermediate products, for example, nickel oxide, nickel sulfide, and ferronickel.

Lithium ion batteries are a new type of secondary batteries developed in recent years, and a key to development of the lithium ion batteries is development of cathode and anode materials of the batteries. The cathode material is one of critical materials for producing the lithium ion batteries, and selection and quality of the cathode material directly decide characteristics and prices of the lithium ion batteries. Since reported for the first time in the year of 1999, a cathode material of a lithium nickel cobalt manganese oxide ternary layered structure has been a powerful competitor of the cathode material of the lithium ion batteries. However, a cycle life of the lithium ion battery is always limited, and thus recovery of waste lithium ion batteries has significant environmental and economic benefits.

Chinese Patent CN 111261967 A (Method for recovering waste lithium batteries) adopts steps, for example, pretreating-reducing and acid leaching-removing impurities by using an iron powder, a nickel powder, a cobalt powder, a manganese powder, and sodium sulfide-hydrolyzing and precipitating by using sodium hydroxide, potassium hydroxide, lithium hydroxide, and aqueous ammonia-acidizing and dissolving by using sulfuric acid-concentrating and crystallizing, to realize the recovery of waste lithium batteries. Chinese Patent CN 10598148 A (Method for recovering valuable metal from waste lithium nickel cobalt manganese oxide batteries) mainly includes steps, for example, discharging the waste lithium nickel cobalt manganese oxide batteries, pulverizing, roasting at a high temperature, leaching by using nitric acid, precipitating copper, iron, and aluminum ions by adding sodium chlorate, precipitating nickel, cobalt, and manganese by adding sodium hydroxide and aqueous ammonia, and precipitating lithium by adding sodium carbonate.

In the foregoing methods, impurities are removed and copper is precipitated by using a nickel powder, a cobalt powder, and a manganese powder, and the nickel powder, the cobalt powder, and the manganese powder react with acid, cannot replace copper ions, and cannot be fully dissolved. The nickel powder and the cobalt powder belong to valuable metals, and consequently the foregoing methods cause waste of resources. Copper is removed by using iron powder and sodium sulfide, and thus impurity elements in a solution system increase, which increases a production cost of subsequent impurity-removal and wastewater treatment. Meanwhile, a large amount of ferrous iron enters a reaction system, which increases a production cost for a subsequent step of removing iron, and also increases contamination of the environment caused by solid waste and a cost of treating the solid waste. Iron and aluminum ions are hydrolyzed by using a strong alkali, and thus valuable metals, nickel, cobalt, and manganese in the solution system are precipitated, causing waste in resources and an increase in a production cost. Copper, iron, and aluminum are precipitated by using sodium hypochlorite, and thus chloride ions are dissolved in the solution system. Chloride ions and strong oxidizing sodium hypochlorite corrode a device, a cost of removing impurities increases when entering a wastewater system, and the environment is contaminated when flowing into a river.

SUMMARY

An objective of the present invention is to provide a method for purifying and removing impurities from a nickel cobalt manganese leaching solution. The method comprehensively utilizes manganese dioxide in manganese ore to oxidize ferrous iron, and consume residual acid, and then utilizes an elemental manganese powder to neutralize and adjust pH, to achieve the objective of purifying and removing impurities.

In order to achieve the objective mentioned above, the following technical solutions are used in the present invention:

A method for purifying a nickel cobalt manganese leaching solution includes the following steps:

(1) Iron and aluminum removing: heating a nickel cobalt manganese leaching solution, stirring, adding a manganese powder, adjusting pH to acidity, performing a reaction, and filtering, to obtain an iron-aluminum slag and an iron and aluminum-removed liquid;

(2) Copper removing: heating the iron and aluminum-removed liquid, stirring, adding a manganese powder, adjusting pH to acidity, performing a reaction, and filtering, to obtain a copper slag and a copper-removed solution;

(3) Nickel and cobalt precipitation: heating the copper-removed solution, stirring, adding an alkaline solution, adjusting pH to alkalinity, performing a reaction, and filtering, to obtain a nickel and cobalt-precipitated solution and nickel cobalt manganese hydroxide; and (4) Dissolution and neutralization: adding water and slurrying the nickel cobalt manganese hydroxide, heating, adding an acid solution to dissolve, adjusting pH to acidity, performing a reaction, heating, stirring, adding a manganese powder, adjusting pH to acidity, and filtering, to obtain an iron-aluminum slag and an accepted nickel cobalt manganese sulfate liquid.

Preferably, in step (1), the nickel cobalt manganese leaching solution is one of a nickel cobalt manganese ternary battery waste leaching solution or a laterite-nickel ore leaching solution.

Preferably, in step (1), a temperature of the heating is 80° C.-95° C.; and a time of the stirring is 10-30 min.

Preferably, in step (1), step (2), and step (4), the manganese powder is at least one of a manganese oxide ore powder, a manganese carbonate ore powder, or an elemental manganese powder.

More preferably, in step (2) and step (4), the manganese powder is an elemental manganese powder, and is electrolytic manganese in the elemental manganese powder.

Preferably, in step (1), the adjusting pH to acidity is adjusting pH to 4.0-4.5.

Preferably, from step (1) to step (4), a time of the reaction is 1~4 h.

Preferably, in step (2), a temperature of the heating is 80° C.-95° C., and a time of the stirring is 10-30 min.

Preferably, in step (2), the adjusting pH to acidity is adjusting pH to 5.5-6.5.

Preferably, in step (2), the copper slag is delivered to an electrolysis workshop for smelting and electrolyzing copper.

Preferably, in step (3), a temperature of the heating is 70° C.-85° C., and a time of the stirring is 10-30 min.

Preferably, in step (3), the adjusting pH to alkalinity is adjusting pH to 7.6-8.5.

Preferably, in step (3), the alkaline solution is one of sodium hydroxide or sodium carbonate.

Preferably, after step (3), the method further includes: taking the nickel and cobalt-precipitated solution for heating, stirring, adding sodium sulfide, and filtering, to obtain manganese sulfide and a lithium-contained manganese-precipitated solution.

More preferably, the lithium-contained manganese-precipitated solution enters a lithium-precipitation process, to obtain lithium carbonate.

Preferably, a molar ratio of the sodium sulfide to manganese in the nickel and cobalt-precipitated solution is (1-5):1.

Preferably, in step (4), the acid solution is one of sulfuric acid or hydrochloric acid.

Preferably, in step (4), the adjusting pH to acidity is adjusting pH to 5.0-5.5.

Preferably, in step (4), a temperature of the heating is 85° C.-90° C., and a time of the stirring is 10-30 min.

Preferably, in step (4), the iron-aluminum slag is returned to step (1) to react with the nickel cobalt manganese leaching solution.

Preferably, in step (4), the adding water and slurrying the nickel cobalt manganese hydroxide is adding water and slurrying the nickel cobalt manganese hydroxide to a solid content of 30-40%.

Experimental principles of the present invention:

Step (1) is iron and aluminum removing: A main component of manganese oxide ore is $MnO_2$, and a main component of manganese carbonate ore is $MnCO_3$. Under acidic conditions, manganese oxide ore has relatively strong oxidizing properties. First, by using the oxidizing properties of manganese oxide ore, in the solution, $Fe^{2+}$ is oxidized to $Fe^{3+}$, $Mn^{4+}$ is reduced to $Mn^{2+}$. Then, under acidic conditions, manganese carbonate ore adjusts a pH value of a solution system, and $Fe^{3+}$ is hydrolyzed to ferric hydroxide and precipitated. By using a solid-liquid separation method, a precipitate is separated from the solution system, and main chemical reaction equations are as follows:

$$MnO_2 + 2Fe^{2+} + 4H^+ \rightarrow Mn^{2+} + 2Fe^{3+} + 2H_2O; \tag{1}$$

$$MnCO_3 + 2H^+ \rightarrow Mn^{2+} + CO_2\uparrow + H_2O; \tag{2}$$

$$Fe^{3+} + 3H_2O \rightarrow Fe(OH)_3\downarrow + 3H^+; \text{ and} \tag{3}$$

$$Al^{3+} + 3H_2O \rightarrow Al(OH)_3\downarrow + 3H^+. \tag{4}$$

Step (2) is copper precipitation: a main component of an elemental manganese powder is elemental Mn; under acidic conditions, Mn reacts with acid to produce $Mn^{2+}$, and $Cu^{2+}$ in the solution system is hydrolyzed to $Cu(OH)_2$; and a precipitate is separated from the solution by using a solid-liquid separation method, and main chemical equations are as follows:

$$Mn + 2H^+ \rightarrow Mn^{2+} + H_2\uparrow; \text{ and} \tag{5}$$

$$Cu^{2+} + H_2O \rightarrow Cu(OH)_2\downarrow + 2H^+. \tag{6}$$

Step (3) is nickel, cobalt, and manganese precipitation: sodium hydroxide has strong alkalinity; when sodium hydroxide is added into the solution system, the acid solution turns into an alkaline solution, and nickel, cobalt, and manganese in the solution are precipitated in the form of hydroxide in an alkaline environment; and then a precipitate is separated from the solution system in a solid-liquid separation manner, and specific reaction conditions are as follows:

$$H^+ + OH^- \rightarrow H_2O; \tag{7}$$

$$Ni^{2+} + Co^{2+} + Mn^{2+} + 6OH^- \rightarrow Ni(OH)_2\downarrow + Co(OH)_2\downarrow + Mn(OH)_2\downarrow; \text{ and} \tag{8}$$

$$Mn + 2H^+ \rightarrow Mn^{2+} + H_2\uparrow. \tag{9}$$

Step (4) is neutralization of the solution: by using a reaction of an elemental manganese powder with acid, the pH value of the solution is adjusted, so that residual impurity elements, such as, iron and aluminum in the solution are precipitated.

Advantages of the Present Invention (1) The present invention involves, first oxidizing ferrous iron in the solution system by using manganese oxide ore, neutralizing and adjusting the pH value by using manganese carbonate ore, removing iron and aluminum, and consuming the residual acid in the solution system and simultaneously leaching manganese carbonate ore to produce manganese sulfate; and (2) The present invention then removes copper by using an elemental manganese powder, and the manganese powder can replace other neutralizing agents, to prevent other impurities from entering the solution system and decrease a production cost, and can also produce manganese sulfate at the same time, to increase production benefits.

BRIEF DESCRIPTION OF DRAWINGS

FIG. 1 is a flowchart of a process according to Example 1 of the present invention.

DETAILED DESCRIPTION

To understand the present invention in depth, descriptions of preferable experimental solutions of the present invention are made with reference to examples in the following, to further describe features and advantages of the present invention, any changes or variations without departing from the gist of the present invention can be understood by a person skill in the art, and the protection scope of the present invention is defined by the scope of the claims.

Element contents of a nickel cobalt manganese leaching solution of Embodiments 1-5 are shown in Table 1.

TABLE 1

Element content of a nickel cobalt manganese leaching solution

| Element | Ni | Co | Mn | Fe | Al | Cu | Ca | Mg | Li | $Fe^{2+}$ | pH |
|---|---|---|---|---|---|---|---|---|---|---|---|
| Content | 85 g/L | 42 g/L | 18 g/L | 3 g/L | 4.5 g/L | 8 g/L | 0.56 g/L | 2.6 g/L | 14.2 g/L | 1.03 g/L | 1 |

Content of Mn in manganese oxide ore: 52%, content of Mn in manganese carbonate ore: 47%, and content of Mn in an elemental manganese powder: >99%.

Embodiment 1

A method for purifying a nickel cobalt manganese leaching solution includes the following steps:

(1) pouring 1 L of a nickel cobalt manganese leaching solution into a beaker, heating up to 85° C., stirring for 20 min, adding a recoverable slag (an iron-aluminum slag) and 2 g of manganese oxide ore, performing a reaction for 1 h, adding manganese carbonate ore, adjusting pH to 4.5, performing a reaction for 2 h, and filtering, to obtain an iron-aluminum slag and an iron and aluminum-removed liquid;

(2) heating the iron and aluminum-removed liquid to 90° C., stirring for 20 min, adding a manganese powder, adjusting pH to 6.0, performing a reaction for 3 h, and filtering, to obtain a copper slag and a copper-removed solution;

(3) heating the copper-removed solution to 85° C., stirring, adding sodium hydroxide, adjusting pH to 8.2, performing a reaction for 2 h, and filtering, to obtain a nickel and cobalt-precipitated solution and nickel cobalt manganese hydroxide;

(4) heating 1 L of the nickel and cobalt-precipitated solution to 80° C., stirring, adding 0.01 g of sodium sulfide, stirring for 1 h, and filtering, to obtain manganese sulfide and a lithium-contained manganese-precipitated solution (the lithium-contained manganese-precipitated solution enters a lithium-precipitation process, to obtain lithium carbonate); and (5) adding water and slurrying the nickel cobalt manganese hydroxide to a solid content of 30%, heating up to 90° C., adding sulfuric acid to dissolve, adjusting pH to 1.5, performing a reaction for 2 h, heating up to 90° C., stirring, adding a manganese powder, adjusting pH to 5.5, performing a reaction for 3 h, and filtering, to obtain an iron-aluminum slag and an accepted nickel cobalt manganese sulfate liquid.

Embodiment 2

A method for purifying a nickel cobalt manganese leaching solution includes the following steps:

(1) pouring 1 L of a nickel cobalt manganese leaching solution into a beaker, heating up to 80° C., stirring for 20 min, adding a recoverable slag (an iron-aluminum slag) and 1.75 g of manganese oxide ore, performing a reaction for 2 h, adding manganese carbonate ore, adjusting pH to 4.0, performing a reaction for 2 h, and filtering, to obtain an iron-aluminum slag and an iron and aluminum-removed liquid;

(2) heating the iron and aluminum-removed liquid to 85° C., stirring for 20 min, adding a manganese powder, adjusting pH to 5.5, performing a reaction for 3 h, and filtering, to obtain a copper slag and a copper-removed solution;

(3) heating the copper-removed solution to 80° C., stirring, adding sodium hydroxide, adjusting pH to 8.0, performing a reaction for 3 h, and filtering, to obtain a nickel and cobalt-precipitated solution and nickel cobalt manganese hydroxide;

(4) heating 1 L of the nickel and cobalt-precipitated solution to 80° C., stirring, adding 0.02 g of sodium sulfide, stirring for 1 h, and filtering, to obtain manganese sulfide and a lithium-contained manganese-precipitated solution (the lithium-contained manganese-precipitated solution enters a lithium-precipitation process, to obtain lithium carbonate); and (5) adding water and slurrying the nickel cobalt manganese hydroxide to a solid content of 35%, heating up to 90° C., adding sulfuric acid to dissolve, adjusting pH to 1.5, performing a reaction for 2 h, heating up to 90° C., stirring, adding a manganese powder, adjusting pH to 5.0, performing a reaction for 3 h, and filtering, to obtain an iron-aluminum slag and an accepted nickel cobalt manganese sulfate liquid.

Embodiment 3

A method for purifying a nickel cobalt manganese leaching solution includes the following steps:

(1) pouring 1 L of a nickel cobalt manganese leaching solution into a beaker, heating up to 90° C., stirring for 20 min, adding a recoverable slag (an iron-aluminum slag) and 1.5 g of manganese oxide ore, performing a reaction for 1 h, adding manganese carbonate ore, adjusting pH to 4.2, performing a reaction for 2 h, and filtering, to obtain an iron-aluminum slag and an iron and aluminum-removed liquid;

(2) heating the iron and aluminum-removed liquid to 95° C., stirring for 20 min, adding a manganese powder, adjusting pH to 6.0, performing a reaction for 3 h, and filtering, to obtain a copper slag and a copper-removed solution;

(3) heating the copper-removed solution to 85° C., stirring, adding sodium hydroxide, adjusting pH to 8.5, performing a reaction for 4 h, and filtering, to obtain a nickel and cobalt-precipitated solution and nickel cobalt manganese hydroxide;

(4) heating 1 L of the nickel and cobalt-precipitated solution to 80° C., stirring, adding 0.03 g of sodium sulfide, stirring for 1 h, and filtering, to obtain manganese sulfide and a lithium-contained manganese-precipitated solution (the lithium-contained manganese-precipitated solution enters a lithium-precipitation process, to obtain lithium carbonate); and (5) adding water and slurrying the nickel cobalt manganese hydroxide to a solid content of 30%, heating up to 90° C., adding sulfuric acid to dissolve, adjusting pH to 1.5, performing a reaction for 2 h, heating up to 90° C., stirring, adding a manganese powder, adjusting pH to 5.5, performing a reaction for 3 h, and filtering, to obtain an iron-aluminum slag and an accepted nickel cobalt manganese sulfate liquid.

Embodiment 4

A method for purifying a nickel cobalt manganese leaching solution includes the following steps:

(1) pouring 1 L of a nickel cobalt manganese leaching solution into a beaker, heating up to 90° C., stirring for 20 min, adding a recoverable slag (an iron-aluminum slag) and 2 g of manganese oxide ore, performing a reaction for 1 h, adding manganese carbonate ore, adjusting pH to 4.5, performing a reaction for 2 h, and filtering, to obtain an iron-aluminum slag and an iron and aluminum-removed liquid;

(2) heating the iron and aluminum-removed liquid to 95° C., stirring for 20 min, adding a manganese powder, adjusting pH to 6.5, performing a reaction for 4 h, and filtering, to obtain a copper slag and a copper-removed solution;

(3) heating the copper-removed solution to 85° C., stirring, adding sodium hydroxide, adjusting pH to 7.6, performing a reaction for 4 h, and filtering, to obtain a nickel and cobalt-precipitated solution and nickel cobalt manganese hydroxide;

(4) heating 1 L of the nickel and cobalt-precipitated solution to 80° C., stirring, adding 0.02 g of sodium sulfide, stirring for 1 h, and filtering, to obtain manganese sulfide and a lithium-contained manganese-precipitated solution (the lithium-contained manganese-precipitated solution enters a lithium-precipitation process, to obtain lithium carbonate); and (5) adding water and slurrying the nickel cobalt manganese hydroxide to a solid content of 30%, heating up to 80° C., adding sulfuric acid to dissolve, adjusting pH to 1.5, performing a reaction for 4 h, heating up to 90° C., stirring, adding a manganese powder, adjusting pH to 5.5, performing a reaction for 3 h, and filtering, to obtain an iron-aluminum slag and an accepted nickel cobalt manganese sulfate liquid.

Embodiment 5

A method for purifying a nickel cobalt manganese leaching solution includes the following steps:

(1) pouring 1 L of a nickel cobalt manganese leaching solution into a beaker, heating up to 90° C., stirring for 20 min, adding a recoverable slag (an iron-aluminum slag) and 1 g of manganese oxide ore, performing a reaction for 1 h, adding manganese carbonate ore, adjusting pH to 4.5, performing a reaction for 2 h, and filtering, to obtain an iron-aluminum slag and an iron and aluminum-removed liquid;

(2) heating the iron and aluminum-removed liquid to 95° C., stirring for 20 min, adding a manganese powder, adjusting pH to 6.0, performing a reaction for 3 h, and filtering, to obtain a copper slag and a copper-removed solution;

(3) heating the copper-removed solution to 85° C., stirring, adding sodium hydroxide, adjusting pH to 7.8, performing a reaction for 4 h, and filtering, to obtain a nickel and cobalt-precipitated solution and nickel cobalt manganese hydroxide;

(4) heating 1 L of the nickel and cobalt-precipitated solution to 80° C., stirring, adding 0.025 g of sodium sulfide, stirring for 1 h, and filtering, to obtain manganese sulfide and a lithium-contained manganese-precipitated solution (the lithium-contained manganese-precipitated solution enters a lithium-precipitation process, to obtain lithium carbonate); and (5) adding water and slurrying the nickel cobalt manganese hydroxide to a solid content of 30%, heating up to 90° C., adding sulfuric acid to dissolve, adjusting pH to 1.5, performing a reaction for 2 h, heating up to 90° C., stirring, adding a manganese powder, adjusting pH to 5.5, performing a reaction for 3 h, and filtering, to obtain an iron-aluminum slag and an accepted nickel cobalt manganese sulfate liquid.

Comparative Example 1 (CN 105958148 A)

A method for recovering valuable metal from a waste lithium nickel cobalt manganese oxide battery material includes steps as follows:

(1) performing discharge treatment on the waste lithium nickel cobalt manganese oxide battery material, and then pulverizing the waste lithium nickel cobalt manganese oxide battery material by using a pulverizer to a particle size less than 149 micrometers accounting for more than 90%;

(2) adding a pulverized lithium nickel cobalt manganese oxide battery material into a roasting furnace together with an additive and roasting, where a roasting temperature is 650-750° C., and a roasting time is 1-5 h;

(3) leaching a roasted lithium nickel cobalt manganese oxide battery material by using 1.1-2.3 mol/L sulfuric acid and 1.5-2.8 mol/L nitric acid, where a volume ratio of sulfuric acid to nitric acid is 1-2:1, a leaching time is 3-5 h, and a leaching temperature is 80-100° C., stirring in a leaching process, where a stirring speed is 90-100 r/min, and filtering, to obtain a leaching solution;

(4) adding a 1.0-1.5 mol/L sodium chlorate solution to the leaching solution obtained in step (3) to adjust a pH value of the leaching solution to 6.7-7.2, precipitating copper, iron, and aluminum ions in the leaching solution, performing liquid-solid separation, to obtain filtrate and a precipitate, and removing the precipitate;

(5) adding a 1.0-1.5 mol/L sodium hydroxide solution and 1.0-1.5 mol/L aqueous ammonia to the filtrate obtained in step (4), adjusting the pH value of the filtrate to 11-12, where a volume ratio of the sodium hydroxide solution to the aqueous ammonia is 1-3:1, precipitating nickel, cobalt, and manganese, and filtering, to obtain a nickel, cobalt and manganese-contained precipitate and a lithium-salt solution;

(6) purifying the lithium-salt solution obtained in step (5), then adding a 1.0-2.3 mol/L sodium carbonate solution, and precipitating, to obtain lithium carbonate; and (7) using the nickel, cobalt and manganese-contained precipitate treated conventionally as a raw material for producing lithium nickel cobalt manganese oxide batteries.

Element components of the nickel and cobalt-precipitated solution in Embodiments 1-5 are detected, and results are shown in Table 2:

TABLE 2

Element component table of a lithium-contained manganese-precipitated solution

| Embodiment Element | Volume (L) | Ni (mg/L) | Co (mg/L) | Mn (mg/L) | Ca (g/L) | Mg (g/L) | Li (g/L) |
|---|---|---|---|---|---|---|---|
| Embodiment 1 | 2.63 | 10 | 5 | 22 | 0.56 | 2.4 | 6.3 |
| Embodiment 2 | 2.58 | 8 | 2 | 18 | 0.54 | 2.8 | 6.4 |
| Embodiment 3 | 2.43 | 4 | 1 | 8 | 0.54 | 2.3 | 6.3 |
| Embodiment 4 | 2.54 | 10 | 4 | 14 | 0.48 | 2.7 | 5.9 |
| Embodiment 5 | 2.47 | 8 | 4 | 12 | 0.50 | 2.5 | 6.2 |

It can be seen from the nickel and cobalt-precipitated solution in Table 2 that the element manganese and the element lithium are mainly further contained, lithium is further precipitated, to obtain lithium carbonate, and a lithium-precipitated liquid is extracted to prepare and obtain a battery-grade manganese sulfate solution, increasing the production revenue.

Element component contents of the iron-aluminum slag in Embodiments 1-5 are detected, and results are shown in Table 3:

TABLE 3

Element content table of an iron-aluminum slag

| Embodiment Element | Weight of a dry slag (g) | Ni (%) | Co (%) | Mn (%) | Fe (%) | Al (%) | Cu (%) |
|---|---|---|---|---|---|---|---|
| Embodiment 1 | 13.65 | 1.51 | 0.31 | 1.65 | 21.64 | 19.68 | 0.01 |
| Embodiment 2 | 10.54 | 1.32 | 0.24 | 1.42 | 28.32 | 24.13 | 0.01 |
| Embodiment 3 | 12.10 | 1.24 | 0.38 | 1.30 | 24.75 | 22.08 | 0.01 |
| Embodiment 4 | 13.64 | 1.58 | 0.30 | 1.17 | 21.58 | 20.65 | 0.01 |
| Embodiment 5 | 13.26 | 1.62 | 0.29 | 1.42 | 21.13 | 19.92 | 0.01 |

It can be seen from the iron-aluminum slag in Table 3 that, components are mainly iron and aluminum, and the iron and the aluminum are returned to step (1) to mix with a manganese powder and then react with the nickel cobalt manganese leaching solution, which is more conducive to removing the iron and the aluminum.

Element component contents of the copper slag in Embodiments 1-5 are detected, and results are shown in Table 4:

TABLE 4

Element content table of a copper slag

| Embodiment Element | Weight of a wet slag (g) | Ni (%) | Co (%) | Mn (%) | Fe (%) | Al (%) | Cu (%) |
|---|---|---|---|---|---|---|---|
| Embodiment 1 | 17.5 | 0.05 | 0.01 | 0.54 | 0.22 | 1.62 | 62.24 |
| Embodiment 2 | 16.4 | 0.02 | 0.01 | 0.62 | 0.31 | 3.45 | 59.15 |
| Embodiment 3 | 17.1 | 0.06 | 0.01 | 1.12 | 0.26 | 3.02 | 58.31 |
| Embodiment 4 | 18.0 | 0.10 | 0.01 | 0.84 | 0.22 | 0.75 | 63.28 |
| Embodiment 5 | 17.4 | 0.04 | 0.01 | 0.46 | 0.25 | 0.91 | 62.64 |

Components of the accepted nickel cobalt manganese sulfate liquid in Embodiments 1-5 are detected, and results are shown in Table 5:

TABLE 5

Element component table of an accepted nickel cobalt manganese sulfate liquid

| Embodiment Element | Ni (g/L) | Co (g/L) | Mn (g/L) | Fe (mg/L) | Al (mg/L) | Cu (mg/L) | $Fe^{2+}$ (mg/L) |
|---|---|---|---|---|---|---|---|
| Embodiment 1 | 96 | 40 | 38 | 2 | 1 | 1 | 0 |
| Embodiment 2 | 85 | 36 | 42 | 1 | 1 | 1 | 0 |
| Embodiment 3 | 84 | 41 | 40 | 1 | 1 | 1 | 0 |
| Embodiment 4 | 88 | 43 | 41 | 1 | 1 | 1 | 0 |
| Embodiment 5 | 90 | 41 | 42 | 1 | 1 | 1 | 0 |

It can be learned from Table 5 that, in the accepted nickel cobalt manganese sulfate liquid of Embodiments 1-5, a content of impurities is less than 0.002%, which meets a solution purification standard. (A mass ratio of Fe, Al, and Cu to Ni, Co, and Mn is $(1.8-2.4)*10^{-5}$, which reaches the solution purification standard)

Loss ratios of nickel, cobalt, and manganese in Embodiments 1-5 and Comparative Embodiment 1 are detected, and results are shown in Table 6:

TABLE 6

Loss ratios of nickel, cobalt, and manganese in Embodiments 1-5 and Comparative Example 1

| Embodiment Loss ratio Element | Ni (%) | Co (%) | Mn (%) |
|---|---|---|---|
| Embodiment 1 | 0.23 | 0.06 | 0.38 |
| Embodiment 2 | 0.18 | 0.05 | 0.37 |
| Embodiment 3 | 0.16 | 0.05 | 0.20 |
| Embodiment 4 | 0.27 | 0.07 | 0.53 |
| Embodiment 5 | 0.25 | 0.06 | 0.39 |
| Comparative Example 1 | 0.98 | 0.15 | 1.0 |

It can be learned from Table 6 that the loss ratios of nickel, cobalt, and manganese of Embodiments 1-5 of the present invention are all less than 0.6%, while the loss ratios of nickel, cobalt, and manganese of Comparative Embodiment 1 are 2-3 times more than those of Embodiments 1-5. In addition, in Comparative Example 1, copper, iron, and aluminum are precipitated by using sodium chlorate, and thus chloride ions are dissolved in the solution system. Chloride ions and strong oxidizing sodium chlorate corrode a device, a cost of removing impurities increases when entering a wastewater system, and the environment is contaminated when flowing into a river.

It can be learned from Tables 2-6 that the present invention oxidizes ferrous iron in the solution system by using manganese oxide ore, neutralizes and adjusts the pH value by using manganese carbonate ore, removes iron and aluminum, consumes the residual acid in the solution system and simultaneously leaches manganese carbonate ore to produce manganese sulfate, and removes copper by using an elemental manganese powder, preventing other impurities from entering the solution system, and decreasing loss of nickel, cobalt, and manganese.

A method for purifying a nickel cobalt manganese leaching solution provided in the present invention is described in detail above. The principle and implementation of the present invention are described herein through specific embodiments. The description about the embodiments of the present invention is merely provided to help understand the method and core ideas of the embodiments of the present invention, including optimal manners. In addition, a person skilled in the art can also put the present invention into practice, including manufacturing and using any apparatus or system, and implementing any combined method. It should be noted that a person of ordinary skill in the art may further make several improvements and modifications to the present invention without departing from the principle of the present invention. These improvements and modifications also fall within the protection scope of the claims of the present invention. The protection scope of the present invention is defined by the claims, and may include other embodiments that can be conceived by a person skilled in the art. If the other embodiments have structural elements that are not different from those described in the claims, or if the other embodiments include equivalent structural elements without substantial differences from word description of the claims, the other embodiments should also be included in the scope of the claims.

The invention claimed is:

1. A method for purifying a nickel cobalt manganese leaching solution, comprising the following steps:
   (1) heating a nickel cobalt manganese leaching solution, stirring, adding a manganese powder, adjusting pH to acidity, performing a reaction, and filtering, to obtain an iron-aluminum slag and an iron and aluminum-removed liquid;
   (2) heating the iron and aluminum-removed liquid, stirring, adding a manganese powder, adjusting pH to acidity, performing a reaction, and filtering, to obtain a copper slag and a copper-removed solution;
   (3) heating the copper-removed solution, stirring, adding an alkaline solution, adjusting pH to alkalinity, performing a reaction, and filtering, to obtain a nickel and cobalt-precipitated solution and nickel cobalt manganese hydroxide; and
   (4) adding water and slurrying the nickel cobalt manganese hydroxide, heating, adding an acid solution to dissolve, adjusting pH to acidity, performing a reaction, heating, then adding a manganese powder, adjusting pH to acidity, and filtering, to obtain an iron-aluminum slag and an accepted nickel cobalt manganese sulfate liquid;
   wherein, in step (1), the manganese powder is a manganese oxide ore powder and a manganese carbonate ore powder; in step (2), and step (4), the manganese powder is an elemental manganese powder;
   in step (1), the adjusting pH to acidity is adjusting pH to 4.0-4.5; in step (2), the adjusting pH to acidity is adjusting pH to 5.5-6.5; in step (3), the adjusting pH to alkalinity is adjusting pH to 7.6-8.5; and in step (4), the adjusting pH to acidity is adjusting pH to 5.0-5.5; and
   in step (4), the iron-aluminum slag is returned to step (1) to react with the nickel cobalt manganese leaching solution.

2. The method according to claim 1, wherein in step (1), the nickel cobalt manganese leaching solution is one of a nickel cobalt manganese ternary battery waste leaching solution or a laterite-nickel ore leaching solution.

3. The method according to claim 1, wherein in step (1), a temperature of the heating is 80° C.-95° C.; and a time of the stirring is 10-30 min.

4. The method according to claim 1, wherein in step (3), the alkaline solution is one of sodium hydroxide or sodium carbonate.

5. The method according to claim 1, wherein after step (3), the method further comprises taking the nickel and cobalt-precipitated solution for heating, stirring, adding sodium sulfide, and filtering, to obtain manganese sulfide and a lithium-contained manganese-precipitated solution.

6. The method according to claim 5, wherein a molar ratio of the sodium sulfide to manganese in the nickel and cobalt-precipitated solution is (1-5): 1.

7. The method according to claim 1, wherein in step (4), the acid solution is one of sulfuric acid or hydrochloric acid.

* * * * *